2,163,088

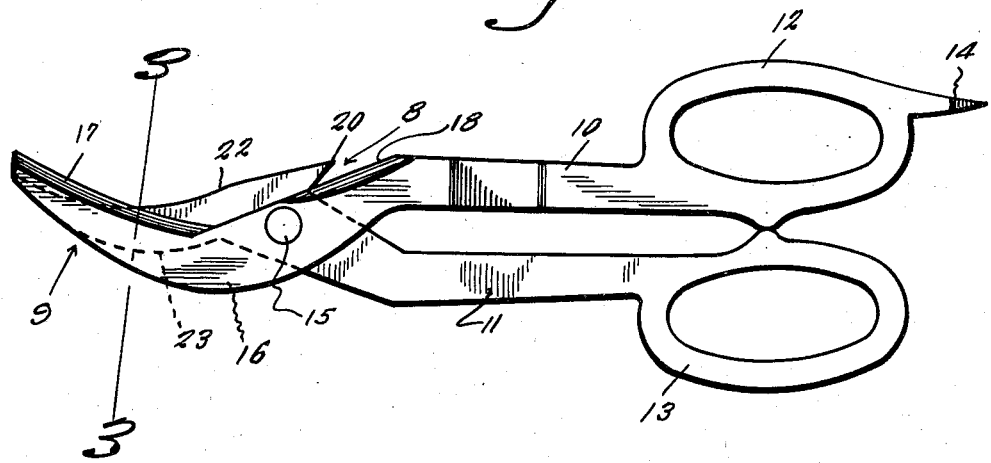
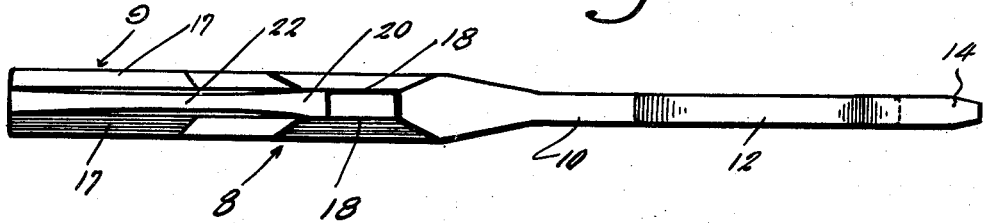
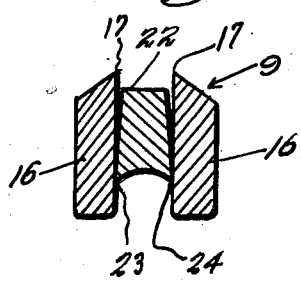
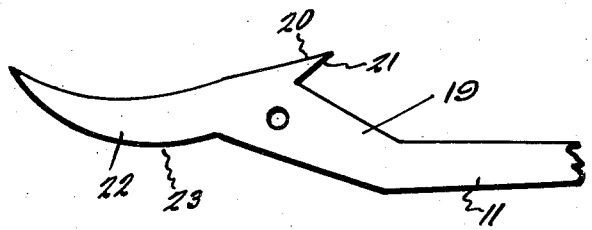
Inventor
George F. Grant
By Clarence A. O'Brien
Hyman Berman
Attorneys June 20, 1939.　　　　G. F. GRANT　　　　2,163,088
DOWNSPOUT CUTTING SHEARS
Filed July 27, 1937　　　2 Sheets-Sheet 2
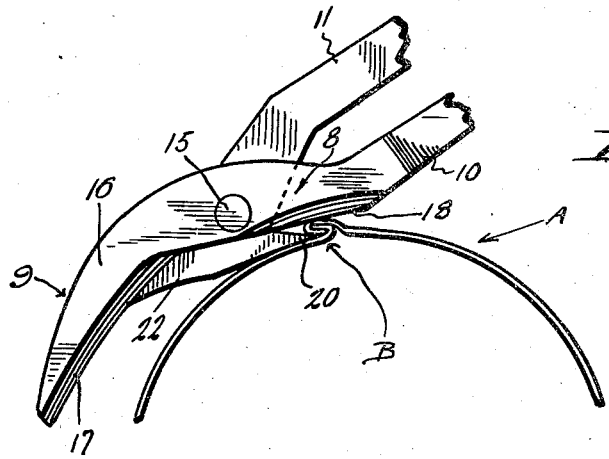
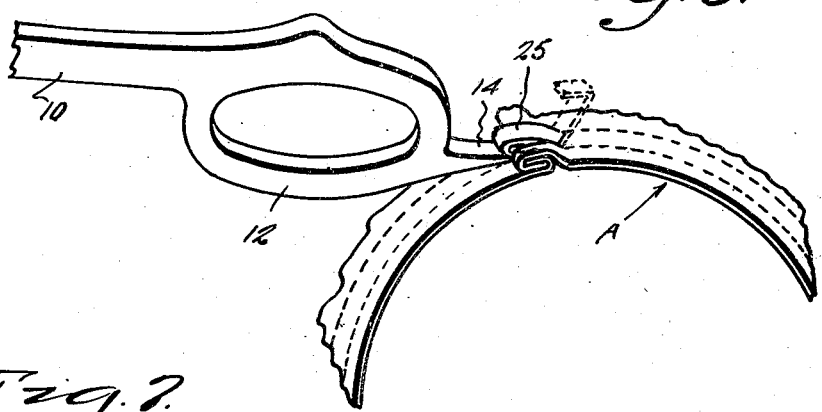
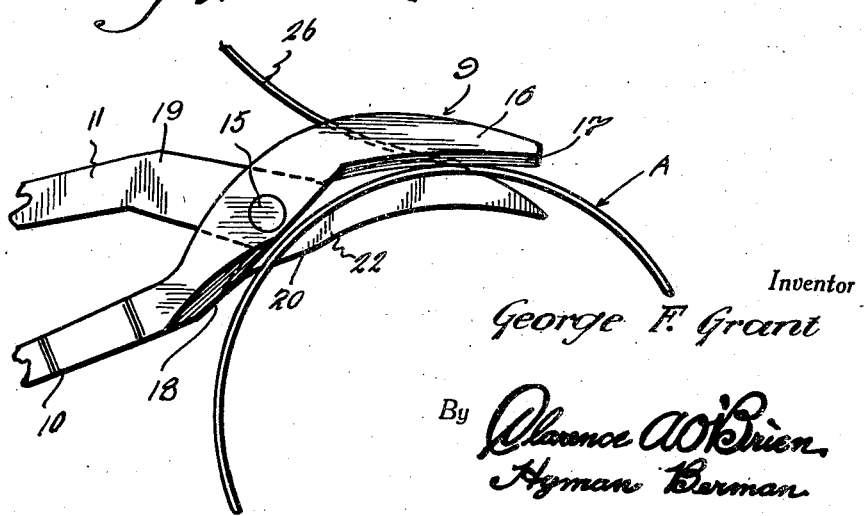
Inventor
George F. Grant
By Clarence A. O'Brien
Hyman Berman
Attorneys Patented June 20, 1939

UNITED STATES PATENT OFFICE 2,163,088

DOWNSPOUT CUTTING SHEARS

George F. Grant, Washington, D. C.

Application July 27, 1937, Serial No. 155,974

4 Claims. (Cl. 30—258)

My invention relates to sheet metal cutting shears of the type adopted for use by tinners and sheet metal workers, and the principal purpose of the invention is to appreciably promote progress in this specific line of endeavor through the medium of what is believed to be a novel and ingeniously designed tool, especially, but not necessarily, developed and perfected to cut downspouts, stove pipes and the like, particularly those constructed or formed with a seam.

Being conversant with the existing practices of the trade, I have discovered the need for the provision of a more practicable cutting tool to accomplish a result heretofore obtained by an antiquated, unsafe and unreliable routine practice. The significance of the preceding statement will be more evident when the reader is reminded that it is the present prevailing practice to use a hack-saw for the purpose of cutting a downspout into predetermined lengths.

As will be attested to by those acquainted with present day practices, the use of a hack-saw literally "hacks" through the tubing. It leaves raw edges, tries the patience of the user, results in broken saw blades, and performs a haphazard job. After the downspout is sawed through, the rough edges have to be straightened with tin cutting shears, or with the hack-saw itself only to complete a wholly unsatisfactory, painstaking and time consuming result.

Confronted with these difficulties, and desirous of providing the trade with a tool calculated to perform with requisite perfection, I have, after due deliberation and consideration, evolved and produced new and novel shears systematically designed and invoking what is believed to be a fundamentally new principle of operation to do the job with extraordinary precision.

In reducing to practice the principle of construction which I have chosen to adopt, I have found it expedient and practicable to provide, in a single tool, means to make the primary cut through the body portion of the metal, and auxiliary but companion means to nip the seam in order to initially puncture the downspout to facilitate insertion of the main cutting jaws.

In order to master the task which it is called upon to perform, the new tool, as will be hereinafter seen, is characterized by a triple jaw construction embodying spaced parallel relatively stationary jaws and an intervening cutting jaw, the three jaws combined serving to coordinate four cutting edges to work through the metal based on a new severing principle.

Other subordinate features and advantages of the invention will become more readily clear to the reader from the following numerically detailed description and accompanying illustrative drawings.

In the drawings, wherein I use like numerals to designate like parts throughout the various views:

Figure 1 is a side elevation of the hand tool constructed in accordance with the principles of the present invention, the jaws being shown closed.

Figure 2 is a a top plan or edge view of Figure 1.

Figure 3 is a somewhat enlarged transverse or cross-sectional view taken approximately on the plane of the line 3—3 of Figure 1.

Figure 4 is a fragmentary side elevational view of the two-way cutting master jaw.

Figure 5 is an elevational view observing one end of a seam made downspout or equivalent structure, showing how the seam nipper functions.

Figure 6 is a perspective view illustrating how the wedge-prong may be utilized to lift out and bend back the double-cut portion of the seam produced from the cutting operation illustrated in Figure 5.

Figure 7 is a view similar to Figure 5 showing the ribbon cutting jaws in action.

By way of introduction to the explanatory detailed description, it is to be pointed out that the tool herein illustrated and described is of course susceptible of adequate use for cutting flat sheets of tin or metal. It is believed, however, that the effectiveness and cardinal importance of the improved shears may be better disclosed on the assumption that said shears were especially designed for effectually cutting sheet metal tubing, especially that which is cylindrical in cross-sectional form. Thus, in Figures 5, 6 and 7, the stove pipe or downspout, as the case may be, is denoted by the letter A. The longitudinal abutting edges of the rolled metal are joined together by a triple-ply or interlocking seam B of a conventional type. Inasmuch as the seam is smashed closely against the body, it is necessary to compensate for this by the incorporation, in the tool, of seam nipper means, this being broadly referred to by the numeral 8 in Figures 1, 2, and 5. By way of contrast, the main ribbon cutting jaws are collectively referred to as a unit by the numeral 9.

The tool itself resembles a pair of scissors, or a pair of sheet metal worker's shears. Hence, there are two levers, the handles of which are differentiated by the numerals 10 and 11, respectively. At their inner ends they are provided with convenient grips 12 and 13, the grip 13 carrying a wedge-shaped extension or prong 14 whose function will be later described. The intersecting portions of the levers are pivotally joined together by a conventional pivot as indicated at 15. In this connection it will be observed that the lever unit 10 is formed on its outer end with a pair of duplicate spaced parallel longitudinally curved jaws 16. These jaws 16 are provided with longitudinally elongated properly curved main cutting edges 17, these being outwardly of, or to the left of, the pivot 15. On the opposite side or to the right of the pivot 15 are somewhat shorter straight cutting edges 18 forming companion features of the seam nipper 8.

The oblique shank portion 19 of the lever 11 is disposed between the intermediate portions of the jaws 16 and pivoted thereto as seen in Figure 1. The shank 19 extends through and beyond the cutting edges 18 at which point it is provided with a substantially V-shaped lug 20 whose surface 21 is in effect an anvil, this cooperating with the companion cutting edges 18. Thus, the several features 18, 20 and 21, and the pivotal joint connection provide a seam nipper usable as illustrated in Figure 5.

The master jaw is denoted by the numeral 22, and as seen in Figure 4, this is longitudinally bowed or curved and swings between the complemental jaws 16, as brought out to advantage in Figure 3 of the drawings. The ends of all jaws are properly pointed to facilitate operation. The working face of the jaw 22 is grooved or otherwise fashioned to provide a pair of spaced parallel cutting edges 23 and 24 which coincide with the cutting edges 17.

In practice I have found it expedient and practicable to first snip the seam, and this is accomplished as illustrated in Figure 5 of the drawings. If the seam is pressed too tightly against the body portion of the tubing A, it can be wedged up by using the prong 14 for the purpose. Then the wedge-type extension 20, which is in effect a miniature cutting jaw, is forcibly jammed underneath the seam, as shown. Now, by spreading the handles apart, the seam is cut transversely through, leaving the severed portion 25 shown in Figure 6. Now, by taking the prong 14 and shoving it underneath the portion 25, it can be opened up and bent back as indicated in dotted lines. This provides an opening in the downspout to facilitate insertion of the main cutting means 9. Hence, instead of puncturing the pipe with an unreliable tool and attempting to get the proper start, the seam is split and pried open, providing the necessary entrance slot to begin the main cutting operation.

Now, by inserting the tip of the cutting jaw 22 and holding the tool as disclosed in Figure 7, and operating it like an ordinary pair of shears, the user can circumscribe the downspout with ease.

The important thing to note from Figure 7 is that as the tool cuts around, it severs a narrow strip 26 which can be conveniently called a ribbon. Moreover, as the tool is fed around, this strip 26 is pushed out from between the jaws 16 by the incoming master jaw 22. Consequently, the curved surface of said jaw 22 functions as a cam to roll the ribbon or strip 10 back and away from the operator. Consequently, there is no likelihood of cutting one's hands.

The curvature of the coacting jaws 22 and 16 enable said jaws to conform to a somewhat corresponding curvature of the part A being acted on, and this is believed to be a new feature in cutting shears. The seam clenching and cleaving mechanism seen in Figure 5, and called broadly the seam nipper 8, is an ingenious adaptation in a tool of this type.

The jaws cut with sheer certainty and perfection, as is evident from Figure 7. They virtually hew out the metal and turn it back and away from the user to enable the desired results to be speedily and positively accomplished. While the prong 14 is important, it is incidental.

It is further submitted that the idea of simultaneously or concurrently making two cuts in a sheet of metal through the instrumentality of the four cutting edges 23, 24, and 17 is in effect a fundamentally new principle of metal severing. It would seem, therefore, that the tool is possessed of noteworthy refinements and appreciable distinctions, these having been carefully selected and mechanically joined to do the work in a desired manner with utmost efficiency and expediency.

It is thought that the description taken in connection with the drawings will enable a clear understanding of the invention to be had. Therefore, a more lengthy description is thought unnecessary.

While the preferred embodiment of the invention is shown and described, it is to be understood that minor changes coming within the field of invention claimed may be resorted to if desired.

I claim:

1. A tool of the class described comprising a lever formed at its outer end with spaced parallel jaws, the jaws being provided on corresponding opposed faces with longitudinally spaced pairs of cutting edges, a second lever cooperable with the first-named lever and having a shank pivotally mounted between said jaws, said second lever terminating in a master jaw swingable between the first-named jaws, said master jaw having a member cooperable with one pair of cutting edges, and having embodied therein spaced parallel cutting edges coinciding with the remaining pair of cutting edges on the first-named jaws.

2. Downspout cutting shears of the class described and primarily usable in connection with a seam equipped sheet metal downspout comprising a lever having a pair of spaced parallel jaws formed on one end thereof, a second lever including a handle portion and a shank portion, said shank portion being pivotally mounted between the intermediate portions of said jaws and terminating in a longitudinally curved head forming a master jaw movable in and out in relation to said first named jaws, the latter jaws being provided with main cutting edges on one side of the pivot, spaced parallel auxiliary cutting edges on the other side of the pivot, said master jaw having spaced parallel cutting edges cooperable with the first named edges and further including an extension lug movable toward and from the auxiliary cutting edges and cooperating therewith in forming a seam nipper.

3. Downspout cutting shears of the class described and primarily usable in connection with an external or folded seam equipped sheet metal downspout comprising a lever having a pair of spaced parallel jaws formed on the outer end thereof, a second lever opposed to said first named lever and having a shank at its outer end, said shank extending between said jaws and being pivotally attached to said jaws at points between the outer and inner end portions of the jaws, said jaws being formed with a pair of relatively short spaced parallel knife-like edges for seam severing purposes, said edges being inwardly of the pivoted shank, and the outer end of said shank being provided wtih a laterally directed wedge-shaped lug, said lug being opposed to and cooperable with said knife-like edges, the knife-like edges and lug coacting in forming a seam nipper which is operable when the levers are spread apart.

4. A hand tool for successively and progressively nipping a rolled seam equipped downspout for the purpose of puncturing the latter and then adapted to circumscribe the body portion of the spout to cut it into sections comprising a lever having a laterally directed shank portion at one end, said shank portion terminating in an obtuse angled head projecting from one side thereof, and a seam lifting and cutting lug projecting at an approximate acute angle from the opposite side thereof, a second complemental lever opposed to the first named lever and provided at its outer end with a pair of spaced parallel jaws, said jaws, at points intermediate their inner and outer ends being pivotally connected to said shank to dispose the major portions on opposite sides of said head to allow the head to work between the jaws, the inner end portion of the said jaws adjacent and opposed to said lug and at points inwardly of said pivot having cutting edges, the cutting edges coacting with the lug in forming a seam nipping, prying and opening device.

GEORGE F. GRANT.